US006236026B1

(12) United States Patent
Schafstein et al.

(10) Patent No.: US 6,236,026 B1
(45) Date of Patent: May 22, 2001

(54) DEVICE FOR WELDING AN ACCESSORY ON A PIPE BY MEANS OF ELECTRICAL HEATING ELEMENTS INTEGRATED IN SAID ACCESSORY

(75) Inventors: Jürgen Schafstein, Remscheid; Werner Hintzen, Köln, both of (DE)

(73) Assignee: Manibs Spezialarmaturen GmbH & Co. KG, Remscheid (DE)

( * ) Notice: Subject to any disclaimer, the term of this patent is extended or adjusted under 35 U.S.C. 154(b) by 0 days.

(21) Appl. No.: 09/529,499

(22) PCT Filed: Sep. 5, 1998

(86) PCT No.: PCT/EP98/05648

§ 371 Date: Feb. 13, 2000

§ 102(e) Date: Feb. 13, 2000

(87) PCT Pub. No.: WO99/19135

PCT Pub. Date: Apr. 22, 1999

(30) Foreign Application Priority Data

Oct. 13, 1997 (DE) .............................. 197 45 203

(51) Int. Cl.$^7$ .................................. B29C 65/34
(52) U.S. Cl. .................. 219/535; 219/544; 219/541; 156/304.2
(58) Field of Search ................... 219/535, 544, 219/541, 476; 156/304.2, 274.2; 285/21.1, 21.2

(56) References Cited

U.S. PATENT DOCUMENTS 5,137,591   8/1992   Gansbuehler et al. .
5,714,738 * 2/1998   Hauschulz et al. ............... 264/299
5,911,895 * 6/1999   Porfido et al. .................. 219/535

FOREIGN PATENT DOCUMENTS 3411179      1/1986  (DE) .
296 16 864 U 1/1997  (DE) .
146775       7/1985  (EP) .
209691       1/1987  (EP) .
253966       1/1988  (EP) .
622171      11/1994  (EP) .
2516439      5/1983  (FR) .

OTHER PUBLICATIONS

Patent Abstracts of Japan, vol. 095, No. 004, May 31, 1995 & JP 07 009569 A (Sekisui Chem Co Ltd), Jan. 13, 1995.
Patent Abstracts of Japan, vol. 097, No. 007, Jul. 31, 1997 & JP 09 070895 A (Hirata Corp; Tokushu Kogyo KK), Mar. 18, 1997.

* cited by examiner

Primary Examiner—John A. Jeffery
(74) Attorney, Agent, or Firm—Friedrich Kueffner

(57) ABSTRACT

A device is disclosed for welding an accessory of thermoplastic material to a pipe or to two pipes of thermoplastic material to be connected to one another. The accessory has at least two segments embracing the circumference of the pipe or pipes. The segments have electrical heating elements at least over portions of their inner surfaces contacting the pipe or pipes. The segments are connected to a welding device via two electrical connecting lines. The two connecting lines form with two connector lines a line combination for a parallel electrical switching of all heating elements. The segments have at their outer surfaces two electrical coupling members for supplying and carrying away an electrical current through the line combination. Counter coupling members of the line combination are contacted with the coupling members of different segments, wherein the coupling members and the counter coupling members are different from each other and are not compatible with each other.

13 Claims, 3 Drawing Sheets

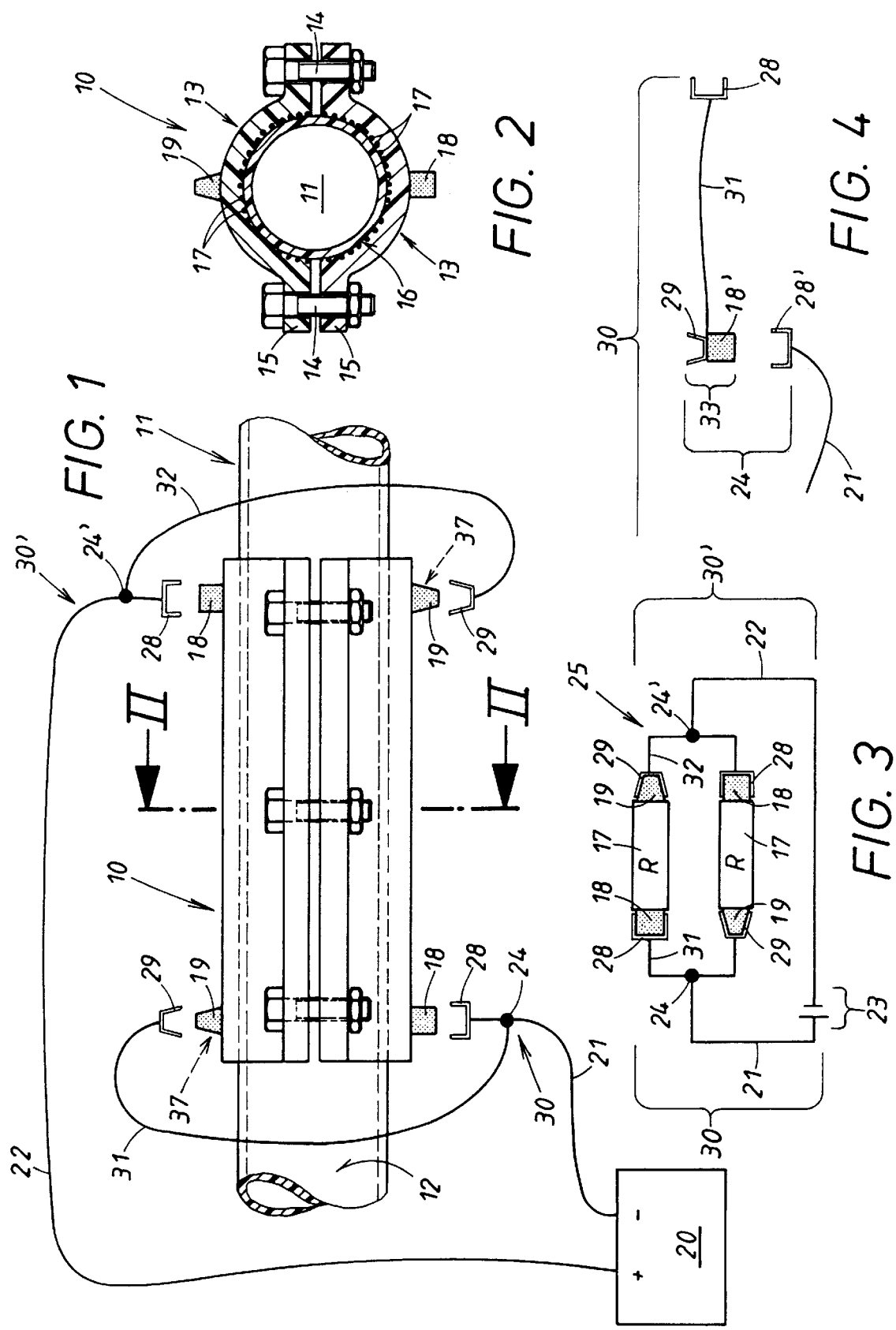

DEVICE FOR WELDING AN ACCESSORY ON A PIPE BY MEANS OF ELECTRICAL HEATING ELEMENTS INTEGRATED IN SAID ACCESSORY

BACKGROUND OF THE INVENTION

1. Field of the Invention

The invention is directed to a device for welding an accessory on a pipe by means of electrical heating elements intergrated in said accessory.

2. Description of the Related Art

The accessory welded to a pipe can serve as a reinforcement or for repairing a defective pipe. The segments can have, for example, a pipe socket for connecting other pipes to the pipe provided with the accessory. Finally, such an accessory can also be used for connecting two pipes. The heating element at the inner surfaces of the segments is heated by electrical current supplied from a welding device and liquefies the thermoplastic material between the circumferential surface of the pipe and the inner surface of the accessory. After cooling and solidification of the melted masses, a solid connection between the pipe and the accessory is realized.

Such accessories are known from DE 296 16 864 U1 wherein two segments are used which have corresponding heating elements and thus have identical electrical resistance relative to one another. In the known welding devices the two heating elements have always been electrically serially connected (serial connection) to the electrical current source of the corresponding welding device. This was achieved in that the electrical counter coupling members of the connecting lines coming from the welding device were contacted to two coupling members at the two segments of the accessory, but that the two further coupling members of the segments were contacted by a connector line to one another. This entails considerable disadvantages.

Since the heating elements are subjected sequentially to current flow, a relatively long welding time results until the required melting of the material at the contact location between the pipe and the accessory has occurred. Because of the duration of the welding time the heat generated by the heating element of the accessory has sufficient time to flow from the welding zone into the material of the accessory as well as that of the pipe. Therefore, it is required to expend more energy for the melting of the material in the known device in order to compensate the energy loss resulting from heat conduction. This means a greater energy expenditure in excess of that of the actual welding process which results in correspondingly high energy costs. Moreover, the migrating heat entails the risk of an insufficient welding of the segments of the accessory relative to one another as well as relative to the pipe.

The invention has the object to develop a reliable device of the kind mentioned above which produces flawless welding connections with minimal energy expenditure.

SUMMARY OF THE INVENTION

The device according to the invention allows an electrical parallel switching of all heating elements of the accessory. This shortens the required welding duration at the contact surfaces of the segments and of the pipe for melting the required melted masses. The short welding duration prevents the diffusion of the heat produced at the heating elements within the material of the segments and of the pipe. Accordingly, a decreased heat amount is required in comparison to the prior art. This parallel switching is realized by the invention in that the two connecting lines are first connected to two independent connector lines so that two line combinations of a connecting line and a connector line result. It is then the two line combinations that support the two counter coupling members which are respectively electrically contacted with the coupling members of two different segments. It is recommended in this context to employ identical segments in the accessory which thus contain identical electrical heating elements. In this way, identical electrical resistance values are provided in the two branches of the parallel circuit, and this results in an ideal uniform welding connection between the accessory and the pipe.

Further measures and advantages of the invention can be taken from the dependent claims, the description, and the drawings. In the drawings, the invention is illustrated in several embodiments. It is shown in:

BRIEF DESCRIPTION OF THE DRAWINGS

FIG. 1 schematically the side view of the device according to the invention in the de-coupled state of the various coupling and counter coupling members at the electrical lines, FIG. 2 a cross-section of the accessory of the device mounted on the pipe along the section line II—II of FIG. 1 before electrical contacting of the counter coupling members, FIG. 3 the electrical circuit diagram for the device of FIG. 1, FIG. 4 schematically a detail of FIG. 1 in an alternative embodiment, FIG. 5 in a partial representation two connector lines of the device shown in FIG. 1 connected to one another to a single component, when the device is embodied according to the schematic of FIG. 4, FIG. 6 in a perspective representation a coupling member at the connector line of FIG. 5, FIGS. 7a and 7b, respectively in a rear and front view, the perspective representation of the coupling member pair provided at the connector line of FIG. 5, and FIG. 8 in a perspective representation the combined electrical contact part for the coupling member pair shown in FIGS. 7a and 7b.

DESCRIPTION OF THE PREFERRED EMBODIMENTS

Figure 5:
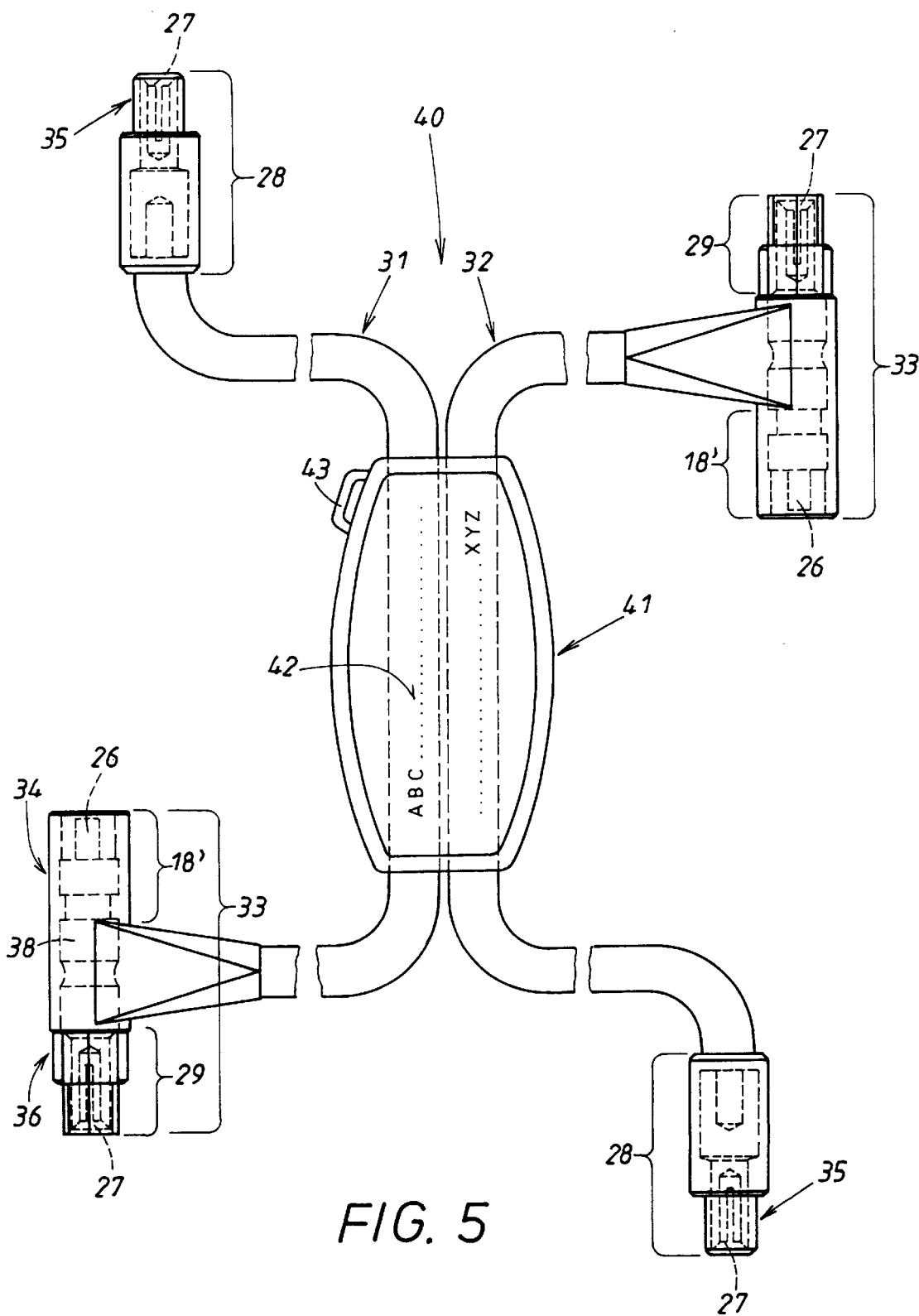
Figure 6:
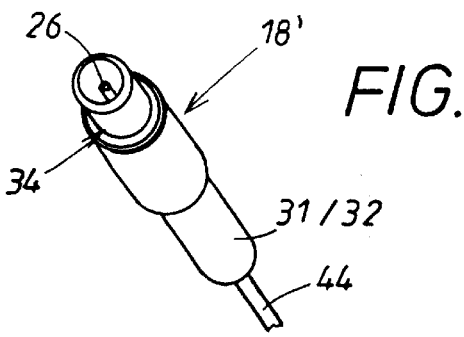

The inventive device comprises first an accessory 10 designed to connect a pipe 11 at a certain location at the pipe's circumferential surface 12. The pipe is comprised of thermoplastic synthetic material. The accessory 10 is comprised of segments 13 wherein in the present case two identical segments 13 are employed. These segments 13 are secured at the circumference of the pipe by clamping means 14, for example, screws and nuts, which force flanges 15 provided at the segments 13 against one another.

These segments 13 comprise heating elements 17 at their inner surfaces 16 which come into contact with the circumferential surface 12 of the pipe, as can be seen in FIG. 2. These segments 13 are comprised of thermoplastic synthetic material where the heating elements 17 are integrated into the inner surface 16 during segment manufacture. These heating elements 1, which are comprised of coiled or serpentine wire, lead to metallic contact parts which respectively belong to two coupling members 18, 19 seated on the outer surface of the segments 13. These coupling members have electrical insulation portions which are formed from the synthetic material of the segments 13 and protect the metallic contact parts but are accessible for a plug-in connection with metallic counter contact parts 26, 27 of two counter coupling members 28, 29 in a manner which will be disclosed in detail later on.

Since both segments 13 are of identical shape and have coinciding electrical heating elements 17, the heating elements 17, schematically illustrated in FIG. 3, have identical electrical resistance R. FIG. 3 shows their parallel connection 25. The metallic contact parts of the two coupling members 18, 19 have at least after their electrical contacting with the metallic counter contact parts 26, 27 of the counter coupling members 28, 29 in summation the same resistance. In the present case, however, the metallic contact parts of the two coupling members 18, 19 are identical to one another; the coupling members 18, 19 differ actually only in the profiled shapes 34, 36 of the electrical insulation parts. The coupling member 18 has a known conventional standard profile 34, while the coupling member 19 has a special profile 36 which will be explained in detail later on with the aid of FIG. 5.

The device of the invention also includes, as is illustrated in the schematic of FIG. 1, a welding device 20 that is of a conventional type. The welding device 20 serves as a current source 23, as illustrated in the circuit diagram of FIG. 3, and its two poles are connected with two electrical connecting lines 21, 22. In the embodiment according to FIG. 1 these two connecting lines 21, 22 end at the connecting locations 24, 24' for two independent connector lines 31, 32. Accordingly, two line combinations 30, 30' result respectively from each pair of electrical connecting lines 21, 22, on the one hand, and connector lines 31, 32, on the other hand.

As can be seen in FIG. 1, both line combinations 30, 30' have matching ends. They are provided with the aforementioned counter coupling members 28, 29. Each of the two combinations 30, 30' has a counter coupling part 28 with standard profile and a counter coupling part 29 with special profile 36. This will be explained in detail, as mentioned above, in connection with FIG. 5.

The coupling state of the electrical members 18, 19 with 28, 29 is illustrated in the circuit diagram of FIG. 3. Neither the plastic parts of the segments 13 nor the plastic pipe 11 is shown. It can be seen that the heating elements 17 of the two segments are switched in parallel by the line combinations 30, 30'. Since, as mentioned before, the electrical resistance values R of the two heating elements 17 as well as of members 18, 28 and 19, 29 contacted in pairs are identical, in both branches the same current will flow. This current is twice as great in comparison to conventional serial connections of the heating elements under identical conditions. This means that the heating elements 17 in a predetermined time interval will receive a four-fold heating energy in comparison to the prior art. The goal of the heating of the heating elements 17 is to liquefy the synthetic material at the contact locations 12, 16 between the accessory 10 and the pipe 11. Since this can be achieved with the present invention in comparison to known devices in approximately one fourth of the time, the heat cannot migrate into further undesirable areas of the material of the accessory 10 and of the pipe 11 but remains concentrated substantially within the contact surfaces 12, 16. The thermoplastic materials of the accessory 10 and of the pipe 11 have bad heat conducting properties, but over the course of time a considerable heat loss by heat conduction can be observed. The invention therefore not only provides a faster welding result but also requires a decreased amount of heat energy. Because of the more rapid melting of the thermoplastic material, an improved welding result is also obtained. The welding connection between the accessory 10 and the pipe 11 is optimal.

Figure 7A:
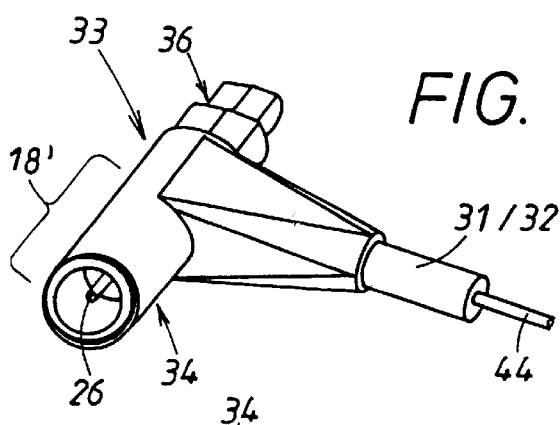

FIG. 4 shows a very advantageous embodiment of the connecting locations 24, 24' of the identically designed two line combinations 30, 30' indicated in FIG. 1. This will be explained with the aid of the one line combination 30 in greater detail. The connector line 31 shown in FIG. 4 has also a coupling member 18' in addition to the two described counter coupling members 28, 29, and a counter coupling member 28' provided at the corresponding electrical connecting line 21 of the welding device 20 can be electrically contacted with the coupling member 18'. The two members 18', 28' are compatible and have a standard profile 34 for the member 18' as illustrated in FIG. 5. As has been mentioned before, the lack of compatibility of corresponding members 18, 28 or 19, 29 depends on the different profile shapes of their insulation parts. The standard profile 34 at the coupling member 18', as is especially illustrated in FIG. 7a, is a cylindrical female plug-in which surrounds the plug-shaped contact part 26 with radial spacing.

A further special feature of the connector line shown in FIG. 4 resides in that the aforementioned coupling member 18' together with a counter coupling member 29 is combined to a special coupling member pair 33. This is embodied in concrete form in the embodiment of FIG. 5. At the other end of the connector line 31 of FIG. 4 the counter coupling member 28 is provided that has also a cylindrical standard profile 35 in this case. This standard profile 35 complements the afore described cylindrical female plug-like profile 34 at the coupling member pair 33. It is comprised of a cylindrical male plug-in 35 surrounding a sleeve-like metallic contact part 27 whose design can be seen in FIG. 8.

The two standard profiles 34, 35 at the connector lines 31, 32 of FIG. 5 are complementary to one another even though in the state of use they will not engage one another. The already mentioned coupling member 18 formed from the plastic material of the segment 13 comprises however the same standard profile 34 as in 18' of FIG. 5. This is illustrated in FIG. 1 by the reference numeral 34. The plug-in contact part is also provided in the coupling member 18 of the segment 13, which is however not illustrated, and the contact part is surrounded by a cylindrical female plug-in. Accordingly, as shown in FIG. 1, the coupling member 18 at the segment side is compatible with the counter coupling member 28 of the connector line 31 as illustrated in FIGS. 4 and 5. In the same manner, the counter coupling member 28', provided at the electrical connecting line 21 of the welding device 20 in the alternative of FIG. 4, has the cylindrical profiled shape of the male plug-in 35 of the afore described counter coupling member 28 of FIG. 5.

This standard profile 35 is the known profiled shape of the counter coupling parts at the connecting line 21, 22 of the prior art welding devices 20. These profiled shapes 35 of the counter coupling members 28' are standardized for welding devices 20. Accordingly, the conventional welding devices available on the market can be retrofitted with the inventively designed special connector lines 31, 32 and can be used for constructing the inventive device of FIG. 1 without any problems. It is only required to produce the segments 13 provided with the coupling members 18, 19 that differ with respect to their profile. They can then be connected in a fool-proof manner with the connector lines 31, 32 of FIG. 4. Faulty connections by inexperienced operators are thus principally prevented.

Figure 8:
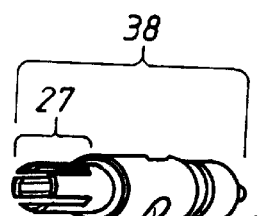

As can be seen in FIG. 8, a one-part connection between the two contact parts designed as a plug-in 26 and a bushing 27 is provided. They are designed as the two ends of a continuous metal body 38 having at its center portion a connecting location 39 for the electrical conductor 44 provided at the end of the connector line 31. This connecting location 39 is comprised simply of a transverse bore into which the conductor end 44 of the cable is inserted. A soldering connection etc. can be provided in order to ensure proper contact.

Figure 7B:
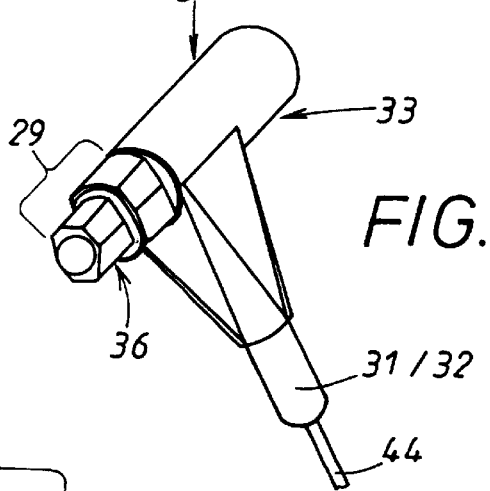

The aforementioned special profile 36 at the counter coupling member 29 of the coupling member pair 33 in the embodiment of FIG. 5 is comprised of an edge profile, especially of a hexagon profile illustrated in FIG. 7b, which is of a stepped design for increasing safety with regard to faulty contacts during coupling. This special profile 36 surrounds, as has been mentioned above, as a mantle the bushing-like contact part 27 of the single-part metallic body 38 and is thus, in analogy to the standard profile 35 of the afore described counter coupling member 28, a profiled shape female plug-in. The complementary profiled male plug-in 37 of this special profile is not illustrated but is at least referenced in FIG. 1 by a reference numeral. The electrically insulating component of the coupling member 19 seated on the segment 13 has this special profile 37.

As can be seen in FIGS. 5 through 7b, the afore described standard or special profiles 34 through 36 of the counter coupling member 28 on one end and the coupling member pair 33 on the other end are injection molded to the electrical connector line 31 and are thus from the beginning of a unitary construction. The counter coupling member 28 at the other line end 31 is also injection molded. As can be seen in FIG. 5, the thus produced two connector lines 31 are identical with the second connector line 32.

A great advantage in regard to handling is, as can be seen also in FIG. 5, that the two lines 31, 32 are combined in a single component 40. For differentiating between them, the two lines 31, 32 and/or their end members 28, 33 can be designed to have different colors. The connection of these two lines 31, 32 is realized by a simple connector 41 which is also a carrier for an information field 42. On this information field 42 the required information in regard to origin, dimensions, and the construction and/or use of the component 40 in the device can be provided in a permanent manner. The connector 41 can also have connecting locations 43, for example, eyes, for connecting tags, not shown in detail, which can contain similar or additional information with regard to the inventive device.

List of Reference Numerals 10 accessory
11 pipe
12 circumferential surface of 11, contact surface
13 segment of 10
14 clamping means at 13
15 flange at 13
16 inner surface of 13, contact surface
17 heating element in 13
18 first coupling member at 13 with standard profile
18' coupling member on 33 with standard profile
19 second coupling member on 13 with special profile
20 welding device
21 first electrical connecting line of 20
22 second electrical connecting line of 20
23 current source in 20
24 connecting location between 21, 31 for 30
24' second connecting location between 22, 32 for 30'
25 parallel connection of 17 (FIG. 3)
26 plug-like, metallic contact part in 18'
27 bushing-like metallic contact part of 29 or 28
28 counter coupling member on 31 or 30 with standard profile
28' counter coupling member on 21 with standard profile (FIG. 4)
29 counter coupling member of 33 or on 31, 32 with special profile
30 line combination of 21, 31
30' line combination of 22, 32
31 first connector line on 21 for 30
32 second connector line on 22 for 30'
33 coupling member pair of 18', 29 (FIG. 4)
34 cylindrical female plug-in with standard profile on 18'
35 cylindrical male plug-in with standard profiled on 28
36 profiled male plug-in with special profile of 29
37 profiled female plug-in with special profile at 19 (FIG. 1)
38 metallic body for 33 (FIG. 8)
39 connecting location for 44 in 38 (58)
40 single component of 31, 32 (FIG. 5)
41 connector for 40
42 information field on 41
43 connecting location, eye on 41
44 electrical conductor of 31 or 32
R electrical resistance of 17

What is claimed is:

1. A device for welding an accessory comprised of a thermoplastic material to a pipe or to two pipes of thermoplastic material to be connected to one another, the pipe or pipes each having a circumference, wherein the accessory comprises at least two segments which embrace the circumference of the pipe or of the two pipes to be connected to one another, the segments comprising an electrical heating element over at least portions of inner surfaces of the segments contacting the pipe or the two pipes to be connected to one another, wherein the segments are connected to a welding device, the welding device serving as an electrical current source for the heating element via two electrical connecting lines, wherein each of the two connecting lines is connected to one of two connector lines, wherein the two connecting lines and the two connector lines form a line combination for an electrical parallel switching of all heating elements in the accessory, the segments having at outer surfaces thereof two electrical coupling members for supplying and carrying away an electrical current to and from the heating element through the line combination, wherein the line combination carries counter coupling members, and wherein the counter coupling members are contacted with the coupling members of different segments for the accessory, wherein the coupling members and the counter coupling members are different from each other and are not compatible with one another.

2. The device according to claim 1, wherein one of the two connector lines has a further coupling member in addition to the two counter coupling members, wherein a counter coupling member of the connecting line of the welding device is contacted with the further coupling member for the welding process, such that the connection of the connector lines to the connecting lines result in the line combination.

3. The device accord ing to claim 2, wherein one of the connector lines has at one end thereof a counter coupling member and at another end thereof a combined coupling member comprised of a counter coupling member for the segments and of a coupling member for the connecting lines.

4. The device according to claim 3, wherein metallic contact parts within the two different coupling members of the segment and metallic counter contact parts of the counter coupling members of the line combination contacting each other have at least in summation the same electrical resistance relative to one another.

5. The device according to claim 4, wherein insulation parts formed of plastic material of the segment of the coupling members of the segment and insulation parts of the counter coupling members of the line combination have different profiled shapes relative to one another, but are configured to be plugged into one another in pairs.

6. The device according to claim 2, wherein the further coupling member and the counter coupling member of one of the connector lines as well as a coupling member on one of the segments and the counter coupling member on each of the two connecting lines have standard profiles, wherein another of the counter coupling members of the connection as well as another of the coupling members on one of the segments have special profiles.

7. The device according to claim 1, wherein the two connector lines for the accessory comprised of two segments are combined in a single component.

8. The device according to claim 7, wherein the single component of the combined connector lines comprises an information field for information.

9. The device according to claim 7, wherein the single component of the combined connector lines has connecting locations for a tag with information.

10. The device according to claim 1, wherein the two connector lines for the accessory comprised for two segments are different for optical differentiation.

11. The device according to claim 10, wherein the two connector lines have different colors.

12. The device according to claim 1, wherein end members of the two connector lines for the accessory comprised of two components are different for optical differentiation.

13. The device according to claim 12, wherein the end members have different colors.

* * * * *